US005394592A

United States Patent [19]

Quick

[11] Patent Number: 5,394,592
[45] Date of Patent: Mar. 7, 1995

[54] POWER TOOL CORD STRAIN RELIEF ARRANGEMENT

[76] Inventor: Todd N. Quick, 241 Avellana #6, Sequim, Wash. 98382

[21] Appl. No.: 190,833
[22] Filed: Feb. 2, 1994
[51] Int. Cl.[6] .................... B23B 45/00; B65D 63/00
[52] U.S. Cl. .................... 24/16 R; 24/17 AP; 24/3 M; 248/52
[58] Field of Search .................... 24/16 R, 17 AP, 3 M, 24/3 A, 298, 301, 302, 323, 326, 335; 248/51, 52

[56] References Cited

U.S. PATENT DOCUMENTS

| | | | |
|---|---|---|---|
| 2,297,661 | 9/1942 | Okun | 24/3 M |
| 2,496,612 | 2/1950 | Wilhide | 248/52 |
| 2,529,567 | 11/1950 | Neck | 24/298 |
| 2,935,773 | 5/1960 | Weckesser | 24/17 AP |
| 3,540,637 | 11/1970 | Ezell | 24/115 G |
| 3,593,950 | 7/1971 | Tetzlaff . | |
| 3,749,818 | 7/1973 | Jemison . | |
| 3,802,011 | 4/1974 | Castagnola | 24/3 A |
| 3,947,924 | 4/1976 | Fox et al. | 24/3 A |
| 4,128,220 | 12/1978 | McNeel | 24/339 |
| 4,558,495 | 12/1985 | Olsen | 248/52 |
| 4,613,192 | 9/1986 | Peterson . | |
| 4,632,488 | 12/1986 | Long et al. . | |
| 4,738,636 | 4/1988 | Bolante . | |

*Primary Examiner*—Victor N. Sakran

[57] ABSTRACT

A power tool includes a power cord extending therefrom, wherein the arrangement includes a tether cord extending along the power cord, with the tether cord secured at one end about the power tool handle within the trigger guard and at its second end to a power cord handle, such that strain is directed through the tether cord rather than the power cord. The arrangement allows for the lowering of power tools from heights without straining of the power cord.

3 Claims, 3 Drawing Sheets

FIG 3
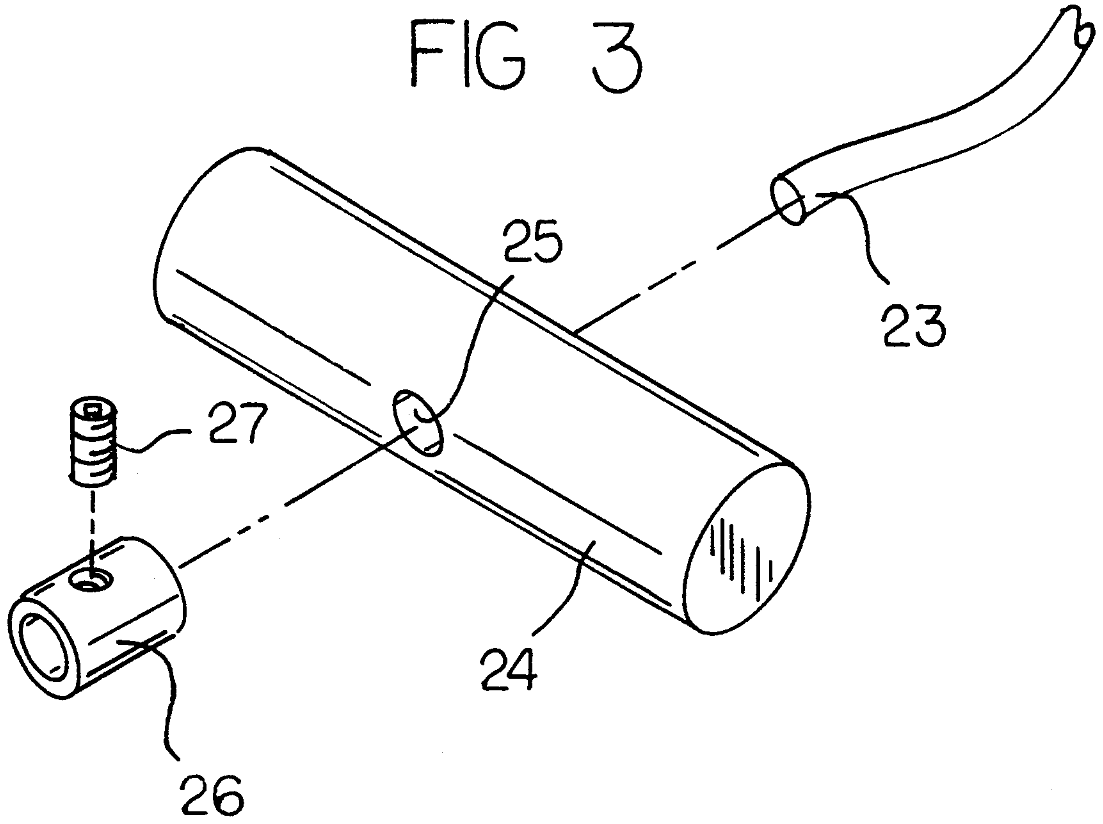
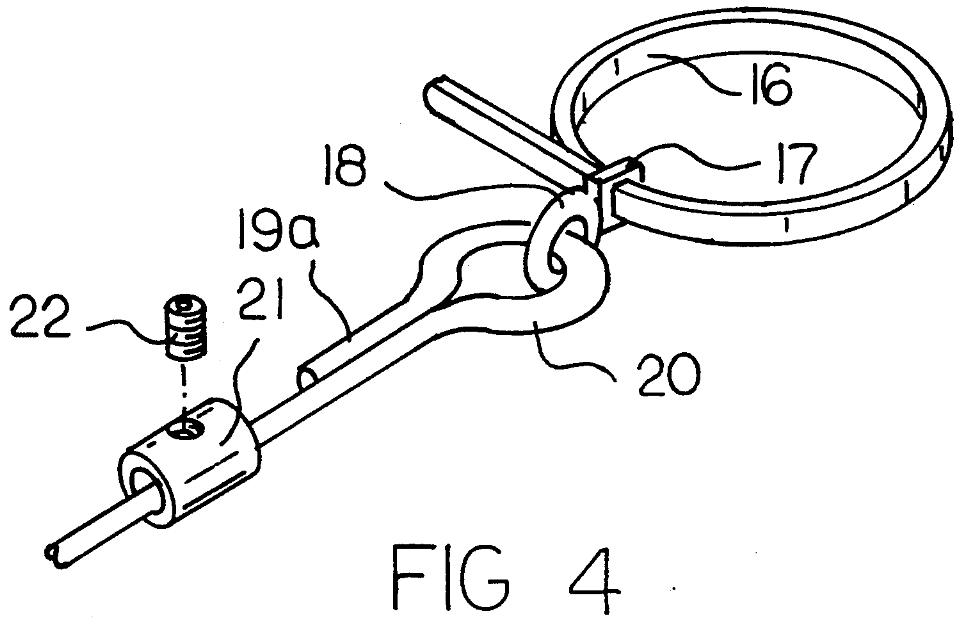
FIG 4

POWER TOOL CORD STRAIN RELIEF ARRANGEMENT

BACKGROUND OF THE INVENTION

Field of the Invention

The field of invention relates to strain relief cord structure, and more particularly pertains to a new power tool cord strain relief arrangement wherein the same is arranged to remove strain from the power cord directed into the tool handle.

Description of the Prior Art

In the use of electrically powered hand tools, internal shorts within the handle due to the stress placed on power cords during lowering of the tool from a ladder, a scaffold, or the like results in the loss of power and more importantly may result in an unintentional grounding of the power supply within the handle.

The prior art provides strain relief connectors for flexible cords and the like such as indicated in U.S. Pat. Nos. 4,738,636; 4,613,192; 3,593,950; 3,749,818; and 4,632,488.

The instant invention attempts to overcome deficiencies of the prior art by providing for a power cord arrangement wherein a tether cord extends substantially coextensively with a power cord and to direct strain to the tool handle rather than the power cord connection within the tool handle and in this respect, the present invention substantially fulfills this need.

SUMMARY OF THE INVENTION

In view of the disadvantages inherent in the known types of cord strain relief structure now present in the prior art, the present invention provides a power tool cord strain relief arrangement wherein the same is arranged to provide for a tether cord mounted to an electrical power cord that orients the tether cord in securement about an associated power tool handle.

As such, the general purpose of the present invention, which will be described subsequently in greater detail, is to provide a new power tool cord strain relief arrangement apparatus and met:hod which has many of the advantages of the prior art listed heretofore and many novel features that result in a power tool cord strain relief arrangement apparatus which is not anticipated, rendered obvious, suggested, or even implied by any of the prior art, either alone or in any combination thereof.

To attain this, the present invention provides an arrangement for use with a power tool which includes a power cord extending therefrom, wherein the arrangement includes a tether cord extending along the power cord, with the tether cord secured at one end about the power tool handle within the trigger guard and at its second end to a power cord handle, such that strain is directed through the tether cord rather than the power cord. The arrangement allows for the lowering of power tools from raised heights without straining of the power cord.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new power tool cord strain relief arrangement apparatus and method which has many of the advantages of the prior art listed heretofore and many novel features that result in a power tool cord strain relief arrangement apparatus Which is not anticipated, rendered obvious, suggested, or even implied by any of the prior art, either alone or in any combination thereof.

It is another object of the present invention to provide a new power tool cord strain relief arrangement which may be easily and efficiently manufactured and marketed.

It is a further object of the present invention to provide a new power tool cord strain relief arrangement which is of a durable and reliable construction.

An even further object of the present invention is to provide a new power tool rain relief arrangement which is susceptible of a low cost of manufacture with regard to both materials and labor, and which accordingly is then susceptible of low prices of sale to the consuming public, thereby making such power tool cord strain relief arrangement economically available to the buying public.

Still yet another object of the present invention is to provide a new power tool cord strain relief arrangement which provides in the apparatuses and methods of the prior art some of the advantages thereof, while simultaneously overcoming some of the disadvantages normally associated therewith.

An even further object of the present invention is to provide a new power tool cord strain relief arrangement which provides a tether cord, a cord handle, and a plurality of tie straps arranged for securing the tether to an electrical power cord of the power tool.

Still yet another object of the present invention is to provide a new power tool cord strain relief arrangement which provides a tether cord, a cord handle, and a plurality of tie straps arranged for securing the tether to an electrical power cord of the power tool, and further includes a plug securing loop extending around the cord handle.

These together with other objects of the invention, along with the various features of novelty which characterize the invention, are pointed out with particularity in the claims annexed to and forming of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an enlarged, exploded isometric illustration of the second end of the tether cord.

FIG. 4 is a further enlarged isometric illustration of a first end of the tether cord.

DESCRIPTION OF THE PREFERRED EMBODIMENT

Figure 1:
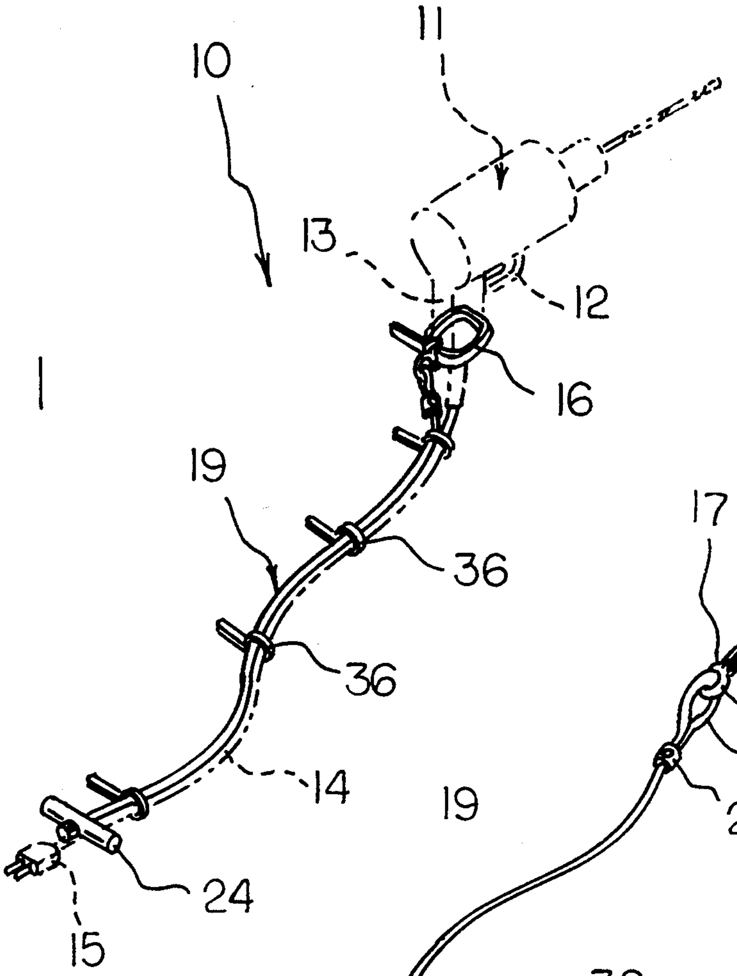
FIG. 1 is an isometric illustration of the invention as installed upon a power tool.

With reference now to the drawings, and in particular to FIGS. 1-6 thereof, a new power tool cord strain relief arrangement embodying the principles and concepts of the present invention and generally designated by the reference numeral 10 will be described.

Figure 2:
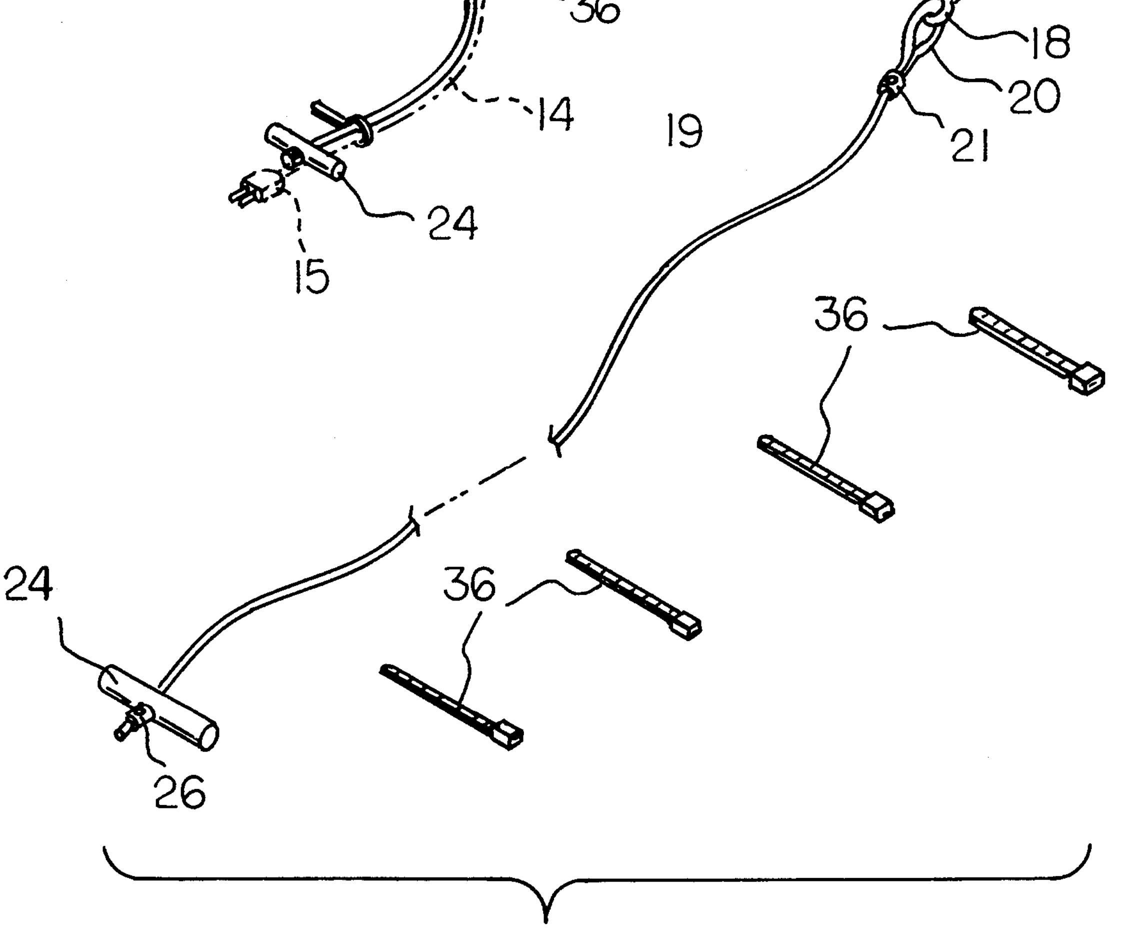
FIG. 2 is a further isometric illustration of the tether cord structure including the tie strap members.

More specifically, the power tool cord strain relief arrangement 10 of the instant invention, as illustrated in FIG. 1, is to be utilized in cooperation with a power tool 11 having a trigger mounted to its handle 13, with a power cord 14 extending from the handle 13 and terminating in an electrical plug 15. Referring now to FIGS. 1, 2, and 4, it can be shown that the invention comprises an anchor loop 16 which may be secured about the handle 13 and directed through the trigger guard 12. The anchor loop 16 is provided with a buckle 17 receiving the strap structure of the anchor loop to secure the anchor loop to the handle 13. A buckle loop 18 is optionally provided to facilitate the attachment of a tether cord 19 thereto.

As best illustrated in FIGS. 3 and 4, the tether cord 19 includes a tether cord first end *19a* spaced from a tether cord second end 23. The tether cord first end *19a* defines a first end loop 20 secured by a first cable lock cylinder 21 which receives the first end *19a*, as well as a portion of the tether cord 19, therethrough. A first cable lock fastener 22 is threadably directed into the first cable lock cylinder 21 to capture and secure the tether cord 19 and the first end *19a* together to define the loop 20. The first end loop 20 may be slidably directed through the buckle loop 18, or optionally merely directed through the anchor loop 16.

As shown in FIG. 3, the tether cord second end 23 projects through a cord handle 24 and more specifically through a cord handle bore 25 formed in the cord handle. A second cable lock 26 is secured to the tether cord second end 23 beyond the cord handle 24, such that the second cable lock 25 abuts the cord handle preventing the removal of the tether cord second end 23 relative to the cord handle 24. In a manner similar the first cable lock cylinder 21, the second cable lock cylinder 25 is provided with a second cable lock fastener 27 which is threadably directed into thereinto to capture and secure the second end 23 of tether cord 19 beyond the cord handle 24.

FIG. 1 illustrates the tether cord 19 extending along the power cord 14 and it can be seen from this figure that a plurality of tie straps 36 are provided to secure the tether cord 19 to the power cord 11. The tie straps 36 are of a type that are, per se, known in the prior art but have heretofore not been employed in the combination noted herein.

Figure 5:
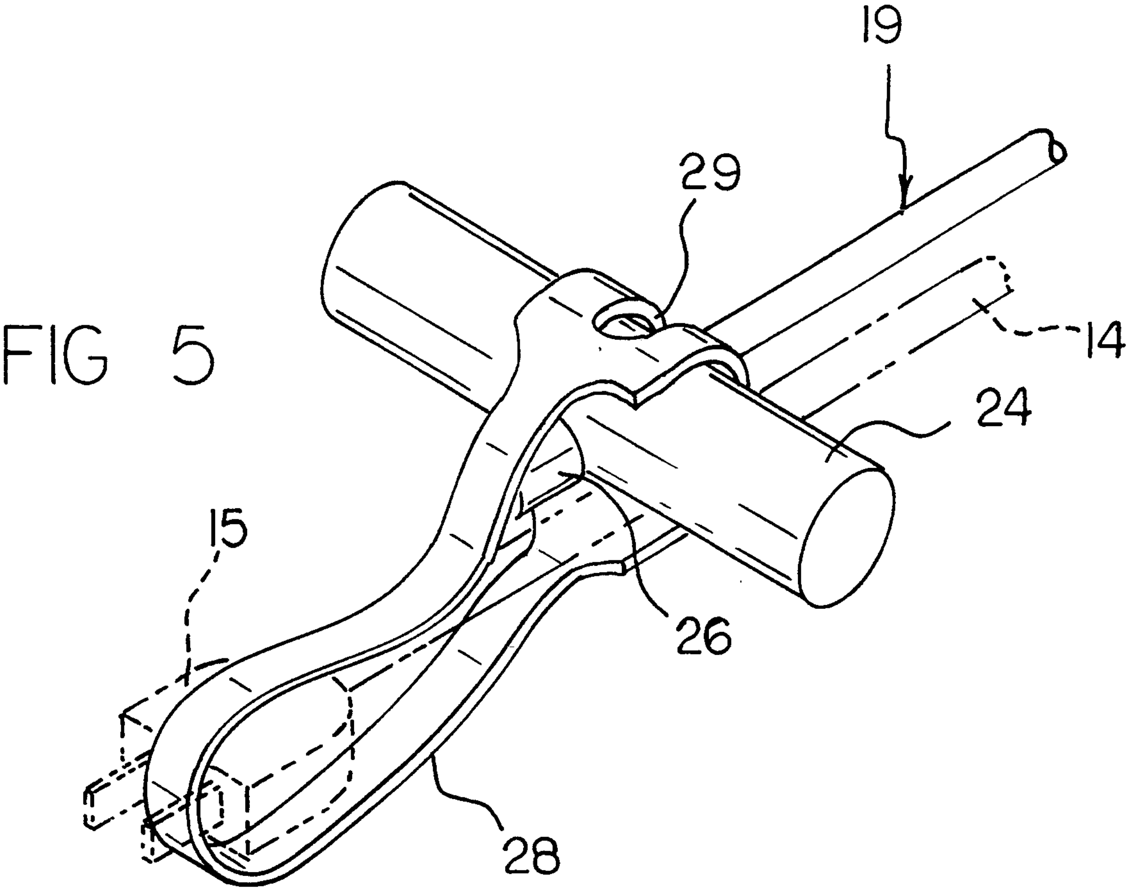
FIG. 5 is an isometric illustration of the invention indicating the second end including a plug securing loop.
Figure 6:
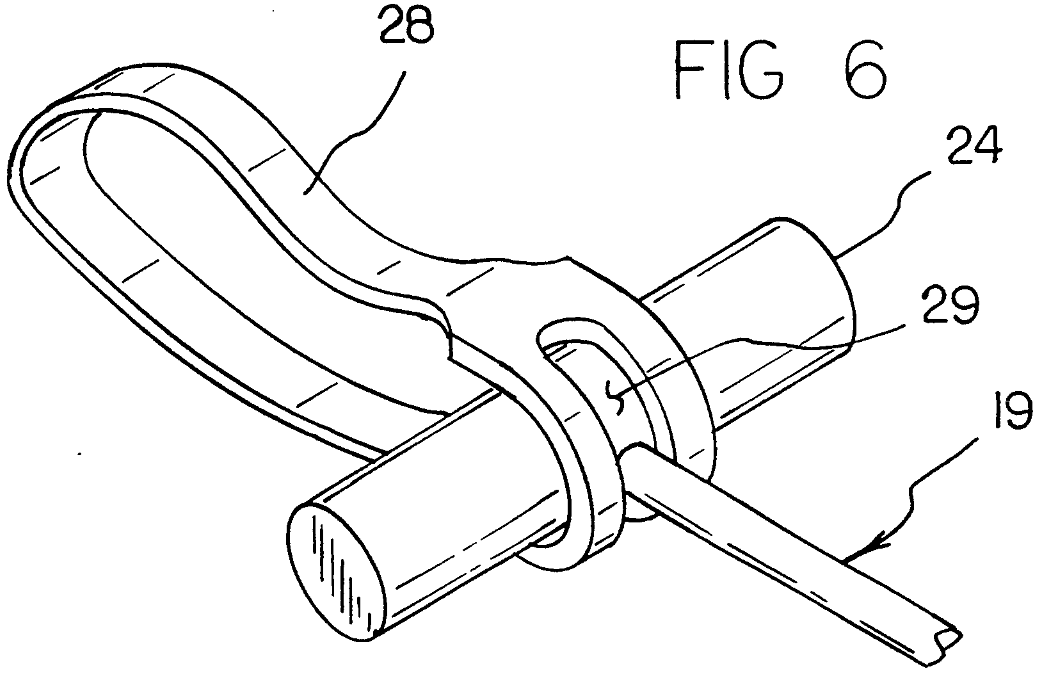
FIG. 6 is an isometric rear view of the plug securing loop mounted relative to the tether cord handle.

The FIG. 5 indicates the optional employment of a plug securing loop 28 that extends about the handle 24. A handle receiving slot 29 directed into the plug securing loop 28 permits the tether cord 19 to be received therethrough. The plug securing loop 28 is thusly oriented between the spaced prongs of the electrical plug 15, such that the strain is removed from the electrical plug when pulling the electrical plug by the tether cord 19 for removal of the electrical plug from an associated unillustrated electrical outlet.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A power tool cord strain relief arrangement comprising:
   - an anchor loop, the anchor loop having a buckle to permit a securing of the anchor loop about a handle portion of a power tool;
   - a tether cord, the tether cord including a tether cord first end and a tether cord second end, the tether cord first end including a first end loop extending from the first end, with the first end loop arranged for securement to the anchor loop;
   - a cord handle the cord handle receiving and securing the tether cord second end relative to the cord handle;

a plurality of the straps arranged for securing the tether to an electrical power cord of the power tool, wherein the tether cord is substantially coextensive with the power cord such that said handle is positioned proximal to a plug of said power cord, whereby said power tool can be suspended by said cord handle a distance substantially equal to a length of said power cord of said power tool.

2. The arrangement as set forth in claim 1, wherein the cord handle includes a handle bore, with the tether cord extending through the handle bore, with a lock cylinder secured to the tether cord second end beyond the cord handle, wherein the handle bore includes a handle bore diameter and the lock cylinder is defined by a lock cylinder diameter greater than said handle bore diameter.

3. A power tool cord strain relief arrangement comprising:

an anchor loop, the anchor loop having a buckle to permit a securing of the anchor loop about a portion of a power tool;

a tether cord, the tether cord including a tether cord first end and a tether cord second end, the tether cord first end including a first end loop extending from the first end, with the first end loop arranged for securement to the anchor loop, said tether cord being substantially coextensive with the power cord;

a cord handle, the cord handle receiving and securing the tether cord second end relative to the cord handle;

a plurality of tie straps arranged for securing the tether to an electrical power cord of the power tool;

wherein the cord handle includes a handle bore, with the tether cord extending through the handle bore, with a lock cylinder secured to the tether cord second end beyond the cord handle, wherein the handle core includes a handle bore diameter and the lock cylinder is defined by a lock cylinder diameter greater than said handle bore diameter;

and further including a plug securing loop extending around the cord handle, with the plug securing loop having a handle receiving slot directed through the plug securing loop, and the tether cord directed through the handle receiving slot, with the plug securement loop arranged for extension around an electrical plug oriented between spaced prongs of said electrical plug such that the tether cord can be utilized to pull the electrical plug from an associated outlet.

* * * * *